(12) United States Patent
Voth et al.

(10) Patent No.: US 10,786,940 B2
(45) Date of Patent: Sep. 29, 2020

(54) APPARATUS AND METHOD FOR PROCESSING PLASTIC CONTAINERS, IN PARTICULAR BY MEANS OF LONG STATORS

(71) Applicant: KRONES AG, Neutraubling (DE)

(72) Inventors: Klaus Voth, Obertraubling (DE); Eduard Handschuh, Donaustauf (DE)

(73) Assignee: KRONES AG, Neutraubling (DE)

( * ) Notice: Subject to any disclaimer, the term of this patent is extended or adjusted under 35 U.S.C. 154(b) by 90 days.

(21) Appl. No.: 16/094,888

(22) PCT Filed: Apr. 25, 2017

(86) PCT No.: PCT/EP2017/059834
§ 371 (c)(1),
(2) Date: Oct. 19, 2018

(87) PCT Pub. No.: WO2017/186742
PCT Pub. Date: Nov. 2, 2017

(65) Prior Publication Data
US 2019/0099936 A1 Apr. 4, 2019

(30) Foreign Application Priority Data
Apr. 25, 2016 (DE) .................. 10 2016 107 588

(51) Int. Cl.
*B29C 49/42* (2006.01)
*B29C 49/64* (2006.01)
(Continued)

(52) U.S. Cl.
CPC .......... *B29C 49/4215* (2013.01); *B29C 49/06* (2013.01); *B29C 49/4205* (2013.01);
(Continued)

(58) Field of Classification Search
CPC ............ B29C 49/4205; B29C 49/4215; B29C 2049/4226; B29C 49/6409; B29C 49/6418; B29C 49/68
See application file for complete search history.

(56) References Cited

U.S. PATENT DOCUMENTS 3,947,180 A * 3/1976 Neumaier ............... B29C 49/06
425/533
9,731,907 B2 * 8/2017 Domeier ............. B29C 49/4215

FOREIGN PATENT DOCUMENTS

| CN | 1263493 A | 8/2000 |
| CN | 1264332 A | 8/2000 |

(Continued)

OTHER PUBLICATIONS

International Search Report dated Jul. 10, 2017 for PCT/EP2017/059834.

(Continued)

*Primary Examiner* — Robert B Davis
(74) *Attorney, Agent, or Firm* — Schmeiser, Olsen & Watts, LLP

(57) ABSTRACT

Provided is a device for treating containers and in particular plastic containers, including a first transport device having a continuous carrier on which a first plurality of transport elements are moveably arranged, each having at least one retainer for retaining plastic preforms and being designed and configured to transport said plastic preforms along a first transport path, and including at least one heating device arranged along the first transport path in order to heat the plastic preforms at least in sections during their transportation along the first transport path.

10 Claims, 2 Drawing Sheets

(51) Int. Cl.
    *B29C 49/06* (2006.01)
    *B29L 31/00* (2006.01)
(52) U.S. Cl.
    CPC .. *B29C 49/6409* (2013.01); *B29C 2049/4226* (2013.01); *B29L 2031/7158* (2013.01)

(56) References Cited

FOREIGN PATENT DOCUMENTS

| | | |
|---|---|---|
| CN | 1464834 A | 12/2003 |
| DE | 102010018153 A1 | 10/2011 |
| DE | 102013105687 A1 | 12/2014 |
| DE | 102013218403 A1 | 3/2015 |
| DE | 102013112091 A1 | 5/2015 |
| DE | 102014115302 A1 | 4/2016 |
| EP | 2848382 A1 | 3/2015 |

OTHER PUBLICATIONS

International Search Report PCT/EP2017/059834.
Chinese Office Action dated Apr. 29, 2020 for Application No. 201780025158.6.

\* cited by examiner

APPARATUS AND METHOD FOR PROCESSING PLASTIC CONTAINERS, IN PARTICULAR BY MEANS OF LONG STATORS

CROSS-REFERENCE TO RELATED APPLICATIONS

This application claims priority to PCT Application No. PCT/EP2017/059834, having a filing date of Apr. 25, 2017, based on German Application No. 10 2016 107 588.4, having a filing date of Apr. 25, 2016, the entire contents both of which are hereby incorporated by reference.

FIELD OF TECHNOLOGY

The following relates to an apparatus and a method for processing plastic containers. In particular in the beverage manufacturing industry it has been known for a long time that for the production of plastic bottles first so-called plastic parisons are heated and these heated plastic parisons are transformed into plastic bottles by transforming devices, such as for example stretch blow moulding machines. In this case different procedures are known for heating of these plastic parisons. Thus, for example, infrared ovens are known through which the plastic parisons are transported and heated. In this case so-called heating mandrels are provided which open into a mouth of the plastic parisons and which in turn are arranged on chains.

BACKGROUND

In this case the spacing is also predetermined by a pitch of this chain or the individual holding mandrels and therefore cannot be changed. As mentioned, the heated plastic parisons are later transformed into plastic bottles by a blow moulding machine. For this purpose, it is necessary to increase the pitch of the individual plastic parisons (i.e. the reciprocal spacing). In the known art this usually takes place with so-called pitch alteration starwheels, which grip the plastic parisons individually and increase the pitch thereof. In addition, solutions are also known in which the heating mandrels are brought to an increased pitch by a linear screw.

SUMMARY

An aspect relates to providing an apparatus and methods which enable simpler handling of such processes. In particular, a possibility should be created in order to be able more easily to increase the said pitches.

An apparatus according to embodiments of the invention for processing containers and in particular plastic containers has a first transport device which has a circumferential carrier on which a first plurality of transport elements are arranged (in particular movably relative to this carrier), which in each case have at least one holding means for holding plastic parisons and which are suitable and intended in order to transport these plastic parisons along a first transport path. Furthermore, the apparatus has at least one heating device which is arranged in particular along the first transport path in order to heat the plastic parisons at least partially during their transport along the first transport path.

According to embodiments of the invention the apparatus has a second circumferential transport device which has a second circumferential carrier on which a second plurality of transport elements are arranged, which in each case have at least one holding means for holding plastic parisons and which are suitable and intended in order to transport these plastic parisons along a second transport path. In this case the second transport path extends at least in sections parallel to the first transport path.

Furthermore, first magnetic drive means are arranged on at least one carrier which co-operate with second magnetic drive means located on the respective transport elements arranged on this carrier, in order to transport these transport elements (in particular relative to the carrier) and/or these at least one transport elements are movable independently of one another relative to the first carrier.

Preferably, however, a succession or sequence of the transport elements arranged on the respective carriers is fixed or does not vary. The transport elements are preferably movable, but particularly preferably are arranged non-removably on the carrier. The individual transport elements are preferably guided by the respective carrier on which they are arranged in such a way that they move along an in particular circumferential transport path. This transport path preferably extends in a (in particular horizontal) plane.

Preferably, due to the parallel configuration of the transport devices, both a transport element of the first transport device and also a transport element of the second transport device is associated with a specific plastic parison at least at times during its transport. In this case it is possible that this plastic parison is at times held both by a holding element of the first transport device and also by a holding element of the second transport device. The number of second transport elements is preferably greater than the number of first transport elements.

Therefore, within the context of embodiments of the invention two transport devices at least partially parallel to each other are proposed, which preferably in each case allow an independent movement of the respective holding means. Due to this configuration of the independent movability it is possible to carry out the required pitch alteration without high expenditure on machinery. In other words, it is proposed that a circumferential carrier, in particular a long stator system, is used, which supports individual holding means or transport elements. A second transport device, which is likewise suitable and intended to grip the plastic parisons, is provided partially parallel to this first transport device. Thus, particularly preferably, two such transport devices and in particular stator circuits are arranged one above the other. Preferably at least one of the two carriers is arranged in a stationary manner. Preferably both carriers are arranged in a stationary manner.

In this case the two holding elements are in each case capable of holding individual plastic parisons particularly preferably along the said section in which the first transport path extends parallel to the second transport path. Thus, particularly preferably along this section or at least a part of this section, the plastic parisons are held by both holding elements (or at least can be held on these sections). Thus, by embodiments of the invention a possibility is created for changing the pitch as required and even to enable a partially cyclical operation of the individual plastic parisons or a cyclical transport of the plastic parisons.

In a further advantageous embodiment, the second transport path is offset below the first transport path and/or laterally relative to this first transport path. In this case the first transport path, i.e. the transport path associated with the first transport device, can be configured as a heating circuit which serves for heating the plastic parisons. In this case in this transport device the individual holding means can be configured for example as mandrels which can be introduced into the mouths of the plastic parisons. As mentioned above, the second transport path can likewise have the movable holding elements which for example can grip the plastic parisons, for example below the carrying rings thereof.

Due to the procedure described here it is possible to change the pitch between the plastic parisons in any way without using mechanical means for this purpose. In particular, corresponding pitches can be set or changed electronically.

In a further advantageous embodiment, the individual holding elements can have wheels in order to guide the holding elements relative to the carriers. The actual movement takes place-as mentioned above-in particular by magnetic forces. The magnetic means which produce this movement can in particular be electromagnets or permanent magnets. Electromagnets are preferably arranged on the carriers and permanent magnets are preferably arranged in each case on the transport elements.

In addition, however, the apparatus can also have energy transmission means in order to transmit electrical energy from the carrier to the individual transport elements. In addition, transmission devices can also be provided in order for example to be able to transmit control signals from the carrier to the individual transport elements. In this way driving elements located on the transport elements can also be supplied with current and also controlled. These energy transmission means or transmitter can be for instance sliding contacts. Energy transmission can also take place by means of the wheels, which preferably roll relative to the individual carriers.

In a further advantageous embodiment, on the other carrier further first magnetic drive means are arranged, which co-operate with further second magnetic drive means arranged on the respective transport elements in order to transport these transport elements. Alternatively, or in addition it would also be possible that the second holding means or holder; or the second transport elements are also movable independently of one another relative to the second carrier.

In this case an independent movability of the individual transport elements is understood to mean that in particular a pitch or a spacing of a specific transport element relative to a preceding and/or following transport element can be set as required. Thus, it would be possible for example that a first transport element at times moves more slowly than a second transport element which, however, is likewise arranged on the same carrier.

In a further advantageous embodiment, the first transport path and the second transport path differ from one another at least in sections. Advantageous the second transport path is longer than the first transport path. Preferably, however, at least two sections of the first transport path which are parallel to one another are parallel to at least two sections of the second transport path which are parallel to one another. The plastic parisons are advantageously transported in opposite directions to one another in these sections of the two transport paths which are parallel to one another.

In a further advantageous embodiment at least one of the two transport paths is oval. Thus this at least one transport path can for example have two sections extending in a straight line and in each case two deflecting sections in which the direction of movement of the plastic parisons is rotated by 180°. Advantageously both transport paths are oval.

For a sequence of a method according to embodiments of the invention it would be possible that first of all a transport element (also referred to below as a "mover") picks up a plastic parison by means of a gripping device, moves the parison into a heating device or an oven and simultaneously thereto, above the mouth of the plastic parison, a mandrel is moved over the mouth and inserted therein by means of the first transport device. As soon as the plastic parison is held by this mandrel, holding means or holder of the further transport device, such as for example gripping pincers, open in order thus for example also to enable a movement of the plastic parison in the form of a rotation.

In this way a variable mandrel pitch is made possible inside the actual heating device. A plurality of heating elements and in particular infrared heating elements are advantageously provided along the first transport path of the plastic parisons. However, the use of a microwave oven is also conceivable in which individual plastic parisons are in each case introduced into microwave resonators and are heated there.

In addition to the described variable pitch between the individual transport elements or the holding mandrel, a rotational speed can preferably also be set variably inside the oven. During the actual heating phase, the plastic parison cannot fall from the holding element or the mandrel. This can be achieved for example by way of a securing means which acts through the second holding device such as, for instance, gripping pincers, on the holding means arranged underneath. In addition, no further transfer of the plastic parisons after the heating is necessary, since they can already be taken up by the second holding elements. In addition, the first holding means or holder, such as for example gripping pincers, can also serve already for shielding against heat or radiation, in order thus to prevent excessive heating of the mouths of the plastic parisons.

In a further advantageous embodiment, the apparatus has a transforming device which is arranged along the second transport path and is suitable and intended for transforming the plastic parisons into plastic containers. This transforming device can be for example a blow moulding machine and in particular a stretch blow moulding machine which has blow moulds, inside which the plastic parisons are blown, in particular by means of compressed air, to produce the plastic containers. For this purpose, the transforming device could have a plurality of such blow moulds which in each case have supply devices, such as blowing nozzles, which supply the heated plastic parisons with compressed air.

In this embodiment several such transforming stations are advantageously arranged alongside one another and in particular in a stationary manner. Furthermore, the individual transforming stations can also have rod-like bodies which can be introduced into the plastic parisons in order to expand these containers in the longitudinal direction. As mentioned above, embodiments of the present invention also enables a cyclical transport of the plastic parisons. In this embodiment it is advantageously possible that the plastic parisons are moved into these stationary transforming stations and are acted upon there by means of compressed air. Thus, the transforming device advantageously has a plurality of transforming stations arranged in a stationary manner. The term "stationary" is understood here to mean that these transforming stations are not, as is partly usually in the prior art, conveyed movably for example on a blow moulding wheel but are arranged in a stationary manner.

This stationary arrangement enables a technically simplified design, for example with regard to the delivery of electrical power, with regard to the delivery of control signals und also with regard to the delivery of blowing air. In addition, the productivity of such an apparatus can be changed for instance by the number of transforming stations. Further transforming stations could also be added to already existing machines.

Therefore, in a further advantageous embodiment at least one transport device is suitable and intended for transporting the plastic parisons cyclically, i.e. for transporting the plastic parisons also with at least temporary standstill phases. This is preferably the second transport device. Both transport devices are preferably suitable and intended for transporting the plastic parisons cyclically.

In a further advantageous embodiment, the transport device which transports the first holding elements, which are in particular heating mandrels, is a long stator system. By means of the second transport device, which is preferably likewise configured as a long stator system, the plastic parisons can be transferred to a closing unit and/or transforming station. Advantageously the first holding elements and the second holding elements are moved, at least in sections, parallel to one another. In this case a second holding element can be associated with each first holding element, and the plastic parison can be guided jointly by these two holding elements. Advantageously the holding elements are, at least partially, active holding elements, for example gripping clamps, which can be actively opened and closed.

Furthermore, in this case the pitch of the first transport element relative to the first carrier and of the second holding elements relative to the second carrier can be electronically adjustable and can also be chosen to be different in particular in the regions in which only one transport device, such as for example the second transport device, is present.

In a further advantageous embodiment, the machine has a coupling device which at least at times produces a coupling of first holding elements, which are movable relative to the first carrier, and second holding elements, which are movable relative to the second carrier. Thus, for example it is possible that the two transport elements which are arranged on the two different carriers are coupled to one another by an introduction movement of a mandrel into the mouth of the plastic parisons.

In addition, it would also be possible that a coupling of the respective holding elements takes place in such a way that for example by a movement of the mandrel into a mouth of the plastic parisons a grip of the second holding means or second holder is simultaneously released, so that the plastic parison is now freely rotatable.

In a further advantageous embodiment, it is also conceivable that a further driving device is provided, which causes a movement of a holding mandrel in its longitudinal direction, i.e. into the mouth of the plastic parisons and/or out of the mouth of the plastic parisons. For this purpose, for example, guide cams could be provided. In this way the mandrels can in each case immerse at specific positions into the plastic parisons and can also to be led out of the plastic parisons again at specific positions.

In addition, an elastic means could be provided which forces the holding means or holder, such as for example holding mandrels, into a specific position, for example into a position in which they extend out of the plastic parisons or are pulled out of the latter.

In a further advantageous embodiment, the apparatus can also have a central driving device which sets all the holding means, such as holding mandrels, in a rotary motion. Thus, for example, a belt wheel could be provided on each of these holding mandrels, which runs on a (for example stationary) belt and so is set in rotation. However, it would also be possible for each individual holding means and in particular each individual holding mandrel to have its own drive.

Furthermore, it would also be conceivable for a control device to control a rotational speed of the first holding elements, such as for example holding mandrels. In this case such information as, for example, information about the rotational speed, also of the second holding elements, for example gripping elements, can be output.

In addition, it would also be possible that one of the two carriers only has drive means such as magnetic drive means partially along the transport path or also has none at all and the holding elements are movable relative to the carrier but the motion is generated by the second holding elements which run on the other carrier. In this case a mechanical coupling can exist at least at times between the relevant holding elements or transport elements. In this case this coupling can be provided by means of the plastic parison to be transported but also by additional mechanical elements, which can produce this connection between the transport elements, for example, by a movement of a holding mandrel or a gripping clamp.

In a further advantageous embodiment at least one holding means and in particular a second holding means is suitable and intended for gripping the plastic parison by means of a carrying or supporting ring.

Advantageously each holding element has at least two wheels which movably support the holding element relative to the carrier, and preferably has at least four wheels. The holding elements preferably have at least six wheels in order to support the holding element movably relative to the carrier. In this case these wheels are advantageously arranged at least partially in a vertical direction one above the other. Wheels of the holding elements which are arranged one above the other are advantageously offset relative to one another in a direction of movement. In a further advantageous embodiment, the carrier has a modular structure. Due to this modular construction different carrier lengths can be implemented and as a result, for example, different heating sections can also be implemented. Thus, for example, the carrier can be made up of a plurality of straight and curvilinear segments, so that the shape of the carrier can be adapted substantially as required.

In a further advantageous embodiment, the first holding means or first holder are suitable and intended for gripping the plastic parisons on a first region of the plastic parisons and the second holding means are suitable and intended for gripping the plastic parisons on a second region of the plastic parisons, wherein the first region and the second region are different from one another. As stated, the first holding means can be, for example, mandrels which engage in the mouths of the plastic parisons and which therefore grip the latter from inside. The second holding means or second holder-as mentioned above-be gripping elements which grip the plastic parisons on their outer circumference.

The first holding means or first holder are advantageously movable in their longitudinal direction in order thus to be introduced into the mouths of the plastic parisons. This longitudinal direction is preferably also a longitudinal direction of the plastic parisons to be processed.

In a further advantageous embodiment, the first transport path is arranged above the second transport path. In addition, however, a lateral offset of the two transport paths would also be possible.

Advantageously at least one first holding means or first holder is arranged rotatably in such a way that a rotation of the plastic parisons with respect to their longitudinal direction is provided.

Furthermore, embodiments of the present invention relate to a method for processing plastic containers, wherein plastic parisons are transported by means of a first transport device along a first predetermined transport path and this first transport device has a first circumferential carrier, along which first transport elements with holding means or holder for holding the plastic parisons move. Furthermore, the plastic parisons are at least partially and/or at least at times heated during their transport along the first transport path. Furthermore, the plastic parisons are transported by means of a second transport device along a second transport path.

According to embodiments of the invention the first transport path and the second transport path extend at least in sections parallel and preferably the transport takes place along the second transport path cyclically, at least in sections and/or at times.

Therefore, it is also proposed by the method that two in particular parallel transport paths are provided, wherein at least during one transport in one of the two transport paths transport takes place cyclically, in particular, in order thus to be able to further process the plastic parisons.

Particularly preferably, during the transport of the plastic parisons by means of the second transport device they are transformed into plastic containers by means of a transforming device. In this case in particular, such a transformation takes place by a blow moulding process, i.e. in particular the plastic parisons are acted upon by a gaseous medium and in particular with compressed air in order to transform them. For this purpose, the plastic parisons are in each case preferably moved by means of the second transport device into blow moulding stations and then the transport is stopped. In this state the blow moulds can be closed and the plastic parisons can be expanded by the supply of compressed air.

In a further advantageous method, the plastic parisons are held at least at times by holding means or holder of the first transport device and by holding means or holder of the second transport device. The plastic parisons are advantageously transferred from holding means or holder of the second transport device to holding means or holder of the first transport device. The plastic parisons are advantageously transferred (in particular at a later time) from holding means or holder of the first transport device to holding means or holder of the second transport device. The plastic parisons are preferably generally transport from one transport device to another transport device (or in each case the transport elements and/or holding elements thereof) and (in particular at a later time) are again taken up by this first-mentioned transport device and transported further.

In this case in a preferred method it would be possible that first the holding means of the second transport device, such as for instance gripping elements, still hold the plastic parisons. While they are being held in this way, holding means of the first transport device, such as for example holding mandrels, immerse into the preform mouths or the mouth portions and/or threaded portions of the plastic parisons. As soon as this has taken place, the second holding means or second holder can loosen their grip and thus can release the plastic parisons at least for a rotation of them. In this case it is also possible that by such a movement of the first holding means or the first holder, such as for instance mandrels, the gripping elements of the second holding elements are opened. Furthermore, it is possible that the first holding means or first holder, for example transport elements which carry mandrels, are shifted or moved at times with the second holding means or the second holder.

The transport elements arranged on the first transport device (or the carrier of the first transport device) preferably receive information concerning a rotational speed of the plastic parisons from the transport elements arranged on the carrier of the second transport device. Furthermore, the apparatus and in particular the transport elements of the first transport device have a storage device in which information is stored, in particular information relating to the product to be processed, for instance the plastic parisons to be processed (such as for instance a material of the plastic parison, a liquid to be introduced and the like).

In a further advantageous method, the plastic parisons are moved by means of at least one transport device by means of magnetic forces. In this case the respective transport devices can have the configurations described above, i.e. the carriers can be designed as long stators and the holding elements, on the other hand, can have further magnetic elements, such as permanent magnets, so that movement is made possible. The plastic parisons are advantageously moved by means of both transport devices in each case by magnetic forces.

BRIEF DESCRIPTION

Some of the embodiments will be described in detail, with references to the following Figures, wherein like designations denote like members, wherein.

DETAILED DESCRIPTION

Figure 1:
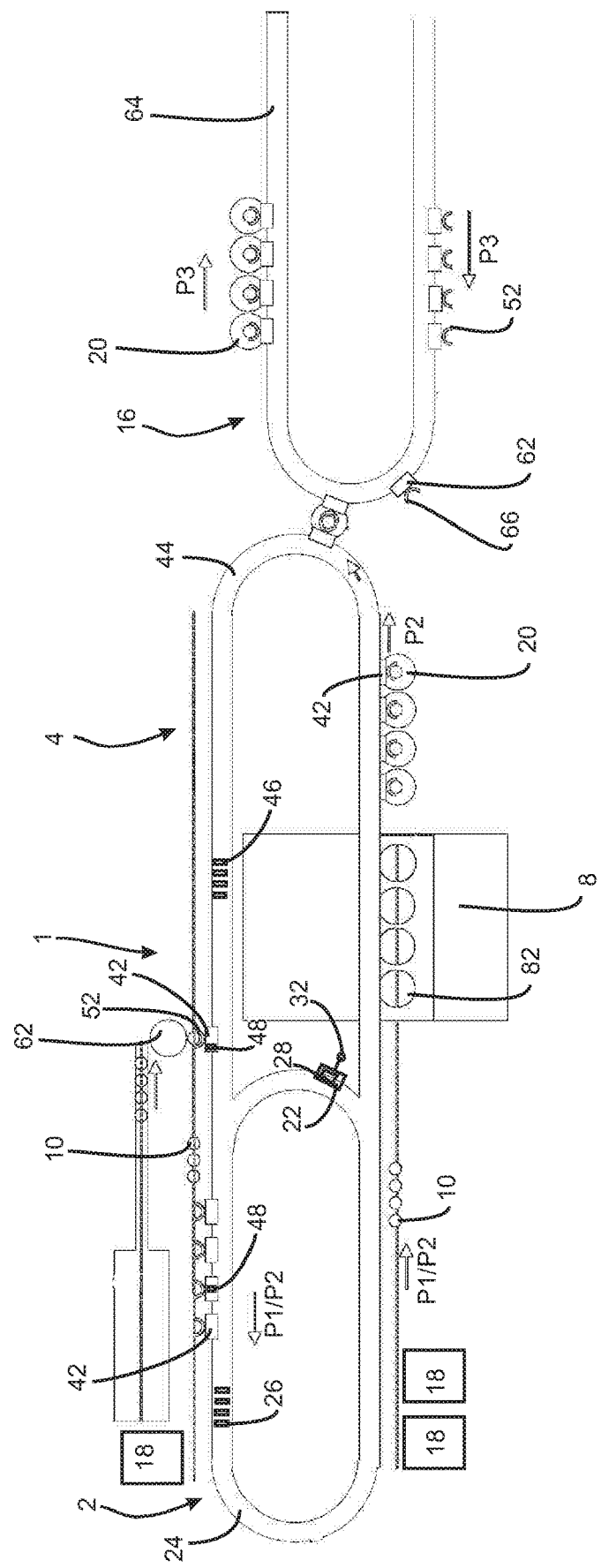
FIG. 1 shows a schematic representation of an apparatus for producing containers.

FIG. 1 shows a schematic representation of an apparatus 1 according to embodiments of the invention for processing plastic containers. In this case this apparatus has a first transport device 2 as well as a second transport device 4. The first transport device 2 has a circumferential carrier 24 on which a plurality of transport elements 22 is movably arranged, so that these can likewise circulate around this stationary carrier 24. For driving these transport elements 22 the carrier has a plurality of magnetic elements 26, such as in particular electromagnets. By corresponding control of these electromagnets, it is possible to move the individual transport elements, which likewise have magnetic elements 28 (in this case in the form of permanent magnets, only one of which is illustrated here).

Holding elements 32 which are intended for holding the individual plastic parisons 10 are arranged on the respective transport elements 22 (explained in greater detail below). These holding elements are mandrels which can be introduced into the mouths of the plastic parisons 10.

The reference numeral 4 designates a second transport device, which likewise has a circumferential carrier 44. Transport elements 42 are likewise arranged movably on this circumferential carrier 44. In this case the transport elements are likewise moved by means of magnetic elements 46 which are arranged on the carrier 44. The reference numeral 48 designates magnetic elements arranged on the transport elements 42, such as permanent magnets, which serve for movement of the transport elements 42. In each case holding elements 52, here in the form of gripping clamps, are arranged on these second transport elements 42.

The references P1 and P2 designate the transport paths along which the transport elements are moved in each case. It will be recognised that in the left region the transport elements of the first transport device 2 and of the second transport device 4 are conveyed parallel. In this region the plastic parisons are heated. For this purpose, the apparatus has a plurality of heating devices 18 which are arranged stationary along the transport path P1 of the plastic parisons 10. These heating devices 18 can be for instance heaters which are arranged along the transport path P1 of the plastic parisons.

After they are heated, the plastic parisons are introduced into a transforming device designated overall by 8. This transforming device here has four transforming stations 82 arranged one behind the other which are arranged stationary, unlike what is often conventional in the known art. For introduction of the plastic parisons, these transforming stations are opened, then the plastic parisons are moved in and there (after the blow moulds are closed) are expanded by application of compressed air to form plastic containers 20. In this case it is possible that the blow moulds of the individual transforming stations are arranged on a common carrier and thus are opened and closed simultaneously or jointly. In this way the mechanics with respect to moving transforming stations is also simplified.

These plastic containers 20 are transferred to a third transport device 16. In this case this third transport device 16 also has a plurality of transport elements 62 which move along the transport path P3. In this case this third transport device 16 can again have a stationary carrier 64 which-as described above-moves the individual transport elements 62 with the gripping elements 66 arranged thereon by magnetic force. In this case a container is also shown which is just being transferred from the second transport device 4 to the third transport device 16. In this case it is possible that this transfer takes place at very low speed, since, as stated above, the individual transport elements can also be moved at variable speeds.

Thus, here in any case the carriers 24 and 44 (but preferably also the carrier 64) are designed as long stators. In a further advantageous embodiment, it is also possible that the individual transport elements themselves have drive means or a driver, such as for instance torque motors or hoist motors, which are likewise supplied with power by the carrier.

Therefore, a pitch of the first transport elements 22 or the second transport elements 42 is adjustable and, in particular in the range in which only the second transport device 4 is present, can be set differently, in order thus to deliver the plastic parisons 10 to the transforming device 8 with a greater pitch.

In the procedure according to embodiments of the invention the plastic parisons 10 are first delivered to the gripping elements 52 of the second transport elements 42. These transport elements run into the region in which the two transport paths P1 and P2 are arranged parallel to one another. In this region a mandrel (not shown) can now immerse into the preform mouth and the gripping element 52 can open easily. Furthermore, it is possible that by this lifting movement of the holding mandrel (not shown) the two transport elements are coupled together. In this case, however-as mentioned above-the individual holding mandrels each have their own drive.

In addition, position detecting devices (not shown) can be provided, which for example detect a specific rotated position of the plastic parisons. This may be advantageous in order, for example, to produce non-circular containers. In the region in which the two transport paths P1 and P2 overlap it is possible that one of the two carriers does not have magnetic elements and thus is passive. In this region the transport elements can be moved by means of the respective other stator or the magnetic elements thereof.

The second holding elements advantageously grip the plastic parisons by means of pincers in particular below the support ring. Thus-as mentioned above-the plastic parisons can be picked up by the second transport elements, can move into the oven and parallel above the mouth of the plastic parison the holding mandrel can move into the mouth. Subsequently the pincers or the second holding element can open, for example by between $1/10$ mm and $5/10$ mm, preferably between $1/10$ mm and $3/10$ mm and particularly preferably between $1/10$ and $2/10$ mm. Subsequently the respective holding mandrel is set in rotation. In this way it is possible to use a variable mandrel pitch in the oven or the heating device. The mandrel is also preferably variably adjustable with regard to its rotation.

Due to the second holding element which is always still present in the form of gripping pincers, the plastic parison is prevented from falling down since the second holding element serves as a securing means or securer in this respect. After the end of the heating the second holding elements can again grip the plastic parisons and the mandrels can be removed from the plastic parisons. Due to this procedure, however, there is no further transfer of plastic parisons from the oven into the transforming device 8. Also-as mentioned above-the mouth of the plastic parisons can be protected by the gripping clamp in particular against overheating.

Figure 2:
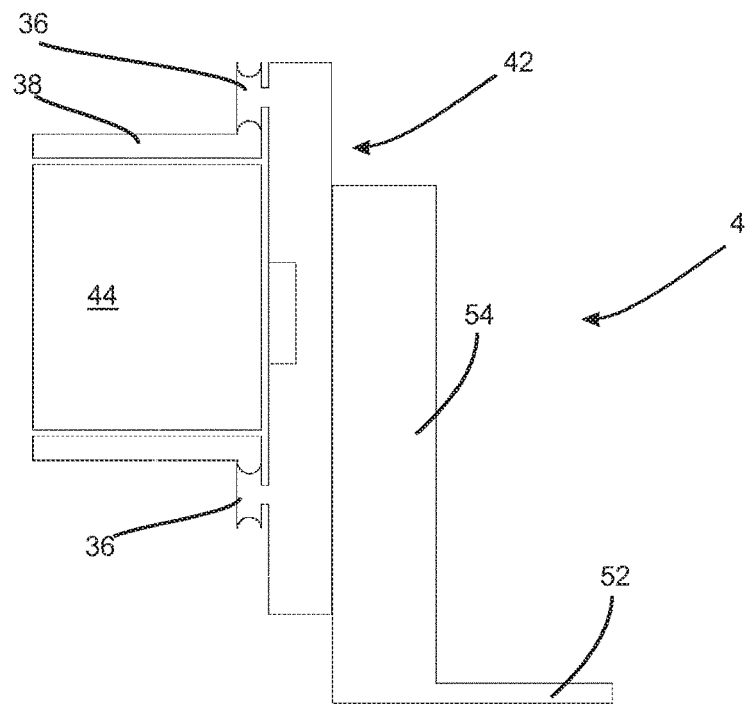
FIG. 2 shows a representation of second transport elements arranged on the carrier.

FIG. 2 shows a schematic representation of the second transport device 4. In this case the circumferential carrier 44 is again shown, on which the transport element 42 is movably arranged. In this case this transport element 42 has a carrier 54 on which a holding element 52, in this case in the form of a gripping clamp, is arranged. In this case this gripping clamp is preferably active and particularly preferably has a drive-in order to open and close the gripping clamp.

The reference numeral 36 relates to wheels by means of which the transport element 42 can roll relative to the carrier 44. The reference numeral 38 designates a carrying region which serves for guiding the holding elements or transport elements 42.

Figure 3:
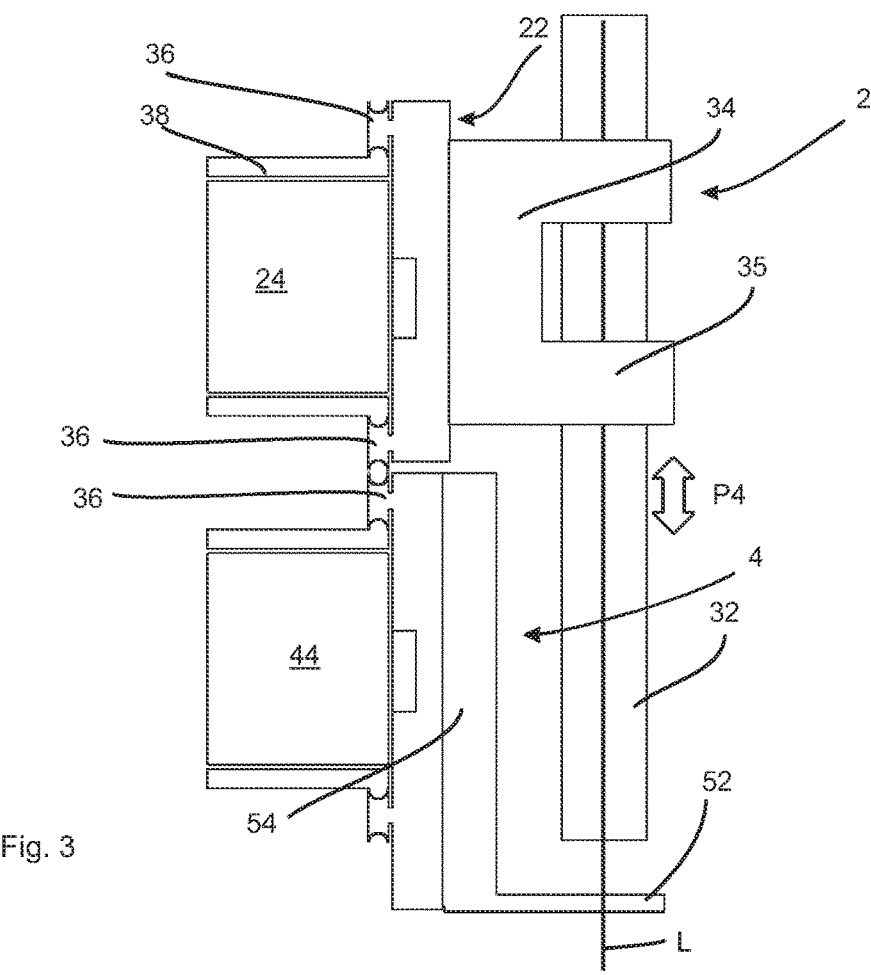
FIG. 3 shows a representation of first and second holding elements.

FIG. 3 shows a representation of an arrangement of the first and second transport devices 2 and 4 one above the other. The first transport device 2 also has-as mentioned above-a circumferential carrier 24 on which the transport elements 22 are movably arranged. In this case these transport elements 22 in each case have a holding mandrel 32 which is movable in the direction of the double arrow P4, i.e. upwards and downwards, in order to move into the mouths of plastic parisons (not shown). The reference numeral 35 designates a guide for this holding mandrel 32. Furthermore, this holding mandrel can have a toothed wheel (not shown), by means of which it can roll relative to a (toothed) guide (not shown). The holding mandrel 32 is preferably rotatable with respect to its longitudinal direction L, which is simultaneously also a longitudinal direction of the plastic parisons which are to be heated.

However, it would also be possible that the transport element 2 has an active drive for rotating the holding mandrel 32. This holding mandrel (not shown) can also have spreading means or spreader in order to be able to clamp a plastic parison.

In addition, by the lowering of the holding mandrel 32 into the mouth of the plastic parison a coupling of the two transport elements 22 and 24 can also take place (for example by means of the plastic parison, but also by means of further elements). In this way the two transport elements 22 and 42 can be coupled together with regard to their movement. This coupling can be released again when the holding mandrel 32 is removed.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCES

L longitudinal direction
P1 transport path
P2 transport path
P3 transport path
P4 double arrow
1 apparatus
2 transport device
4 second transport device
8 transforming device
10 plastic parison
16 third transport device
18 heating devices
20 plastic container
22 transport element
24 circumferential carrier
26 magnetic element, magnetic drive means
28 magnetic element, magnetic drive means
32 holding mandrel
35 guide
36 wheel
38 carrying region
42 transport element
44 circumferential carrier
46 magnetic element
48 magnetic element
52 holding element/gripping element
54 carrier
62 transport element
64 circumferential carrier
66 gripping element
82 transforming station

The invention claimed is:

1. An apparatus for processing containers, having a first transport device which has a circumferential carrier on which a first plurality of transport elements are arranged movably and in each case have at least one first holder for holding plastic parisons and which are suitable and intended to transport these plastic parisons along a first transport path, with at least one heating device which is arranged along the first transport path in order to heat the plastic parisons at least in sections during their transport along the first transport path, characterised in that the apparatus has a second circumferential transport device which has a second circumferential carrier on which a second plurality of transport elements are arranged, which in each case have at least one second holder for holding the plastic parisons and which are suitable and intended to transport these plastic parisons along a second transport path, wherein the second transport path extends in sections parallel to the first transport path, wherein on at least one carrier first magnetic driver are arranged which co-operate with second magnetic driver located on the respective transport elements arranged on this carrier, in order to move these transport elements relative to the carrier, wherein transport elements arranged on at least one carrier are movable independently of one another relative to this carrier, and wherein the apparatus has a transforming device which is arranged along the second transport path and which is suitable and intended for transforming the plastic parisons into plastic containers.

2. The apparatus according to claim 1, wherein on the other carrier further first magnetic driver is arranged which co-operates with further second magnetic driver located on the respective transport elements arranged on this carrier, in order to move these transport elements, and/or wherein the further second transport elements arranged on the other carrier are movable independently of one another relative to the other carrier.

3. The apparatus according to claim 1, wherein the first transport path and the second transport path differ from one another in some sections.

4. The apparatus according to claim 1, wherein at least one transport device is suitable and intended for transporting the plastic parisons cyclically.

5. The apparatus according to claim 1, wherein the first holder is suitable and intended for gripping the plastic parisons on first regions of the plastic parisons and the second holder is suitable and intended for gripping the plastic parisons on a second region of the plastic parisons, wherein the first regions and the second regions are different from one another.

6. The apparatus according to claim 1, wherein at least one first holder is arranged rotatably in such a way that it effects a rotation of the plastic parisons relative to their longitudinal axes.

7. A method for processing plastic containers, wherein plastic parisons are transported by means of a first transport device along a first predetermined transport path and this first transport device has a first circumferential carrier, along which first transport elements with a holder for holding the plastic parisons move, and wherein the plastic parisons are heated at least at times during their transport along the first transport path, and wherein the plastic parisons are transported by means of a second transport device along a second transport path, characterised in that the first transport path and the second transport path extend at least in sections parallel and the transport takes place along the second transport path cyclically at least in sections, wherein on at least one carrier first magnetic driver is arranged which co-operates with second magnetic driver located on the respective transport elements arranged on this carrier, in order to move these transport elements relative to the carrier, wherein transport elements arranged on at least one carrier are movable independently of one another relative to this carrier, and wherein, during the transport of the plastic parisons by means of the second transport device they are transformed into plastic containers by means of a transforming device.

8. The method according to claim 7, wherein the plastic parisons are held at least at times by a holder of the first transport device and by a holder of the second transport device.

9. The method according to claim 7, wherein the plastic parisons are moved by means of at least one transport device by magnetic forces.

10. An apparatus for processing containers, having a first transport device which has a circumferential carrier on which a first plurality of transport elements are arranged movably and in each case have at least one first holder for holding plastic parisons and which are suitable and intended to transport these plastic parisons along a first transport path, with at least one heating device which is arranged along the first transport path in order to heat the plastic parisons at least in sections during their transport along the first transport path, characterised in that the apparatus has a second circumferential transport device which has a second circumferential carrier on which a second plurality of transport elements are arranged, which in each case have at least one second holder for holding the plastic parisons and which are suitable and intended to transport these plastic parisons along a second transport path, wherein the second transport path extends in sections parallel to the first transport path, wherein on at least one carrier first magnetic driver are arranged which co-operate with second magnetic driver located on the respective transport elements arranged on this carrier, in order to move these transport elements relative to the carrier, wherein transport elements arranged on at least one carrier are movable independently of one another relative to this carrier and wherein the first transport path is arranged above the second transport path.

\* \* \* \* \*